United States Patent

Ho et al.

[11] Patent Number: 5,856,372
[45] Date of Patent: Jan. 5, 1999

[54] MICROCELLULAR ELASTOMERS WITH IMPROVED PROCESSABILITY AND PROPERTIES

[75] Inventors: David J. Ho, Singapore, Singapore; William A. Gill, South Charleston, W. Va.; Susan M. Clift, Lansdale, Pa.; Nigel Barksby, Dunbare, W. Va.

[73] Assignee: ARCO Chemical Technology, L.P., Greenville, Del.

[21] Appl. No.: 652,062

[22] Filed: May 23, 1996

[51] Int. Cl.⁶ .................................................. C08G 18/10
[52] U.S. Cl. ........................... 521/159; 521/137; 521/914
[58] Field of Search .................... 521/914, 159, 521/137

[56] References Cited

U.S. PATENT DOCUMENTS

| | | | |
|---|---|---|---|
| 3,393,243 | 7/1968 | Cuscurida | 260/615 |
| 4,282,387 | 8/1981 | Olstowski et al. | 568/618 |
| 4,861,805 | 8/1989 | Saavedra et al. | 521/105 |
| 5,010,187 | 4/1991 | Heuvelsland | 536/120 |
| 5,114,619 | 5/1992 | Heuvelsland | 252/182.27 |
| 5,470,813 | 11/1995 | Le-Khac | 502/175 |
| 5,483,908 | 1/1996 | Le-Khac | 502/156 |
| 5,648,447 | 7/1997 | Seneker et al. | 528/63 |

OTHER PUBLICATIONS

ASTM D–2849–69 "Testing of Polyurethane Polyol Raw Materials" Dec. 19, 1969.

R.L. Mascioli, "Urethane Applications for Novel High Molecular Weight Polyols" 32nd Annular Polyurethane Technical/Marketing Conf., Oct. 1–4, 1989, pp. 139–142.

*Primary Examiner*—Rachel Gorr
*Attorney, Agent, or Firm*—Jonathan L. Schuchardt

[57] ABSTRACT

Microcellular polyurethane elastomer shoe sole components have exceptional physical properties may be prepared from isocyanate-terminated prepolymers derived from polyoxypropylene diols having a molecular weight of from about 2000 Da to 8000 Da, an unsaturation less than about 0.02 meq/g, and a random oxyethylene content of from about 5 to about 15 weight percent. The shoe sole components exhibit high tensile strength, elongation, resilience, and in addition have excellent tear strength, particularly 90° angle tear.

14 Claims, No Drawings

MICROCELLULAR ELASTOMERS WITH IMPROVED PROCESSABILITY AND PROPERTIES

TECHNICAL FIELD

The present invention pertains to microcellular polyurethane shoe soles. More particularly, the present invention pertains to microcellular polyurethane midsoles and unitsoles exhibiting improved physical properties, prepared from compositions exhibiting improved processability.

BACKGROUND ART

Microcellular shoe soles have become common, particularly for athletic shoes, but increasingly for other shoes as well. In contrast to solid elastomers which were traditionally used before the advent of microcellular elastomers, microcellular shoe sole components offer the opportunity to manufacture shoes with increased cushioning and lighter weight. Although early microcellular components often attained these advantages at the expense of durability and wear resistance, great strides have been made in these areas, and now the use of microcellular components is virtually universal. Microcellular polyurethanes are particularly well suited for these uses.

In the molding of microcellular shoe sole components, prepolymer systems are generally used. Such systems include an isocyanate-terminated prepolymer, prepared by the reaction of 4,4'-methylenediphenylene-diisocyanate (4,4'-MDI, "pure" MDI) or MDI variants with a polyoxypropylene diol, and cured by reaction of the prepolymer with a diol chain extender, e.g. 1,4-butanediol. A minor amount of water, in conjunction with a catalyst which catalyzes the $CO_2$-producing water/isocyanate reaction, provides the necessary blowing to produce the small, uniform cells characteristic of microcellular elastomers. The density is generally between about 0.2 $g/cm^3$ and 0.5 $g/cm^3$, considerably less than non-cellular polyurethane elastomers, but considerably higher than cellular polyurethanes such as flexible and high resilience flexible foams.

Despite the great improvements which have been made in microcellular polyurethane shoe sole components over the past years, room for considerable improvement still exists. For example, production speed is limited by the time necessary to achieve the requisite "green strength" which allows the molded component to be removed from the mold without tearing and without suffering permanent deformation. Lowering demold time through increased catalyzation is possible, however, the processing window generally suffers as a result. Increased catalyzation can also negatively affect physical properties. Use of high primary hydroxyl polyols, commonly used to increase reactivity of conventional polyurethane foams, is of no help in prepolymer-based microcellular foams, as the polyol component has been prereacted into the prepolymer, and thus the higher reactivity of the primary hydroxy group is irrelevant.

Physical properties of the molded foam product are also important. Improvements in comfort-related properties such as resiliency, support factor, and the like, as well as lowered density, are well known areas where continual efforts toward improvement are being made. Less well known, however, are such factors as tensile strength, elongation, and tear strength. While each of these is to some degree related to desirable end-use physical characteristics, these properties are important in processing as well. For example, a microcellular formulation which produces a product having higher ultimate tensile and tear strength will reach the level of physical properties (green strength) necessary to allow demolding more quickly as compared to a formulation producing microcellular foams having lower ultimate physical properties. The higher tensile and tear strengths will also allow removal from the mold with less frequency of damage, reducing the scrap rate during the molding process. Such characteristics are also required of the demolded, fully cured products, which frequently must be stretched, pulled, or pushed into various shoe cavities, coverings, etc.

SUMMARY OF THE INVENTION

It has now been surprisingly found that large and unexpected improvements in physical properties can be achieved in microcellular polyurethanes when the isocyanate-terminated prepolymer component is a 12–20% NCO-content prepolymer prepared by reaction of a stoichiometric excess of one or more isocyanates with a low unsaturation polyoxypropylene diol having a molecular weight of from about 2000 Da to 8000 Da, an unsaturation less than 0.02 meq/g, and a random oxyethylene content between 5 mol percent and 15 mol percent. The microcellular polyurethanes prepared from the subject invention prepolymers are characterized by greatly increased tensile strength, elongation and tear strength, particularly 90° tear strength. In addition, the elastomers exhibit early development of green strength allowing for short demold times.

DESCRIPTION OF THE PREFERRED EMBODIMENTS

The isocyanates used in preparing the isocyanate-terminated prepolymers are preferably 4,4'-MDI, other MDI blends containing a substantial portion of the 4,4'-isomer, and modified MDI made by reacting MDI with itself or with an additional component to introduce carbodiimide, allophanate, uretonimine, urea, urethane, biuret, or other linkages into the isocyanate (MDI variants). The isocyanate may also be selected from other aromatic isocyanates such as toluene diisocyanate or aliphatic or cycloaliphatic isocyanates such as hexamethylene diisocyanate and isophorone diisocyanate. Blends of these various isocyanates may also be used. Preferred are 4,4'-MDI, carbodiimide-modified MDI, and blends of these. The isocyanate is used in stoichiometric excess and reacted with the polyol component using conventional prepolymer reaction techniques to prepare prepolymers having from 12 to about 20 weight percent free NCO groups, preferably 15 to about 20 weight percent, and most preferably about 15 to 19 weight percent.

The polyoxyalkylene diol used to prepare the isocyanate-terminated prepolymer (prepolymer diol) is a critical aspect of the invention. The prepolymer diol must be a polyoxypropylene diol containing from about 5 to about 15 weight percent random oxyethylene moieties and must have an unsaturation less than about 0.02 meq/g. The prepolymer diol has a molecular weight of from about 2000 Da to 8000 Da. Mixtures of low unsaturation, random oxyethylene-containing, polyoxypropylene diols may be used as well. Molecular weights and equivalent weights are number average molecular weights and equivalent weights unless otherwise specified.

By the term "polyoxypropylene" in the context used herein is meant a polyoxyalkylene polyol or mixture thereof in which the majority of the non-oxyethylene oxyalkylene moieties are derived from propylene oxide. Preferably, all the non-oxyethylene moieties are oxypropylene moieties derived from propylene oxide. However, it would not depart from the spirit of the invention to include other $C_3$ or higher alkylene oxides during alkylene oxide polymerization, such as, in particular, oxetane, 1,2- and 2,3-butylene oxides, and the like. By the term "diol" is meant a component which is substantially difunctional, i.e. does not contain more than about 10 to 20 mol percent of higher functional polyol species such as triols, tetrols, hexols, and the like. Preferably, the diol has an actual functionality in the range of about 1.9 to about 2.2.

The polyoxypropylene diol must have an unsaturation of less than about 0.02 meq/g polyol as measured by ASTM D-2849-69, "Testing of Polyurethane Polyol Raw Materials." During conventional, base catalyzed oxypropylation, propylene oxide may rearrange to allyl alcohol which itself may be oxypropylated to form allyl-capped polyoxypropylene monols. This competing rearrangement is discussed, for example, in BLOCK AND GRAFT POLYMERIZATION, Vol. 2, Ceresa, Ed., John Wiley & Sons, pp. 17–21. Continued rearrangement and oxypropylation results in a lowering of the nominal, or "theoretical" functionality of two expected for a diol, to actual functionalities in the range of 1.5 to 1.6 at equivalent weights of c.a. 2000 Da. At this equivalent weight, the composition may contain as much as 40–50 mol percent monol.

Attempts to lower unsaturation and decrease the presence of monofunctional species have been largely unsuccessful until relatively recently. Use of extremely mild reaction conditions with traditional basic catalysts is not practical due to the long reaction times involved (days to weeks), and slightly lowered temperatures have little effect. Use of oxyalkylation catalysts such as calcium napthenates, cesium hydroxide, barium hydroxide, or strontium hydroxide, has resulted in some improvement. For example, use of cesium and rubidium hydroxide is disclosed in U.S. Pat. No. 3,393,243, while strontium and barium oxides and hydroxides are disclosed in U.S. Pat. Nos. 5,010,187 and 5,114,619. U.S. Pat. No. 4,282,387 discloses use of alkaline earth metal carboxylates such as calcium naphthenate.

However, real improvement has been shown by the use of double metal cyanide complex catalysts as disclosed in U.S. Pat. Nos. 5,470,813 and 5,482,908. Although prior double metal cyanide catalysts were able to reduce unsaturation to the range of 0.015 to 0.018 meq/g, the cost/activity ratio and necessity for catalyst removal from the polyol product prevented commercialization. The use of the catalysts of the foregoing U.S. patents has been able to reduce unsaturation to unprecedented levels in the range of 0.004 to 0.007 meq/g, and at the same time render catalyst removal rapid and inexpensive. In some cases, the catalyst activity is so high that the low amount of catalyst required may be left in the polyol product. In the present invention, the prepolymer diol must have an unsaturation below 0.02 meq/g, preferably about 0.015 meq/g or below, more preferably below 0.010 meq/g, and most preferably in the range of 0.007 meq/g or lower.

It has been surprisingly discovered that employment of polyols with lowered levels of unsaturation and higher theoretical functionality is not without its problems. For example, attempts to use ultra low unsaturation polyols as drop-in replacements for conventionally catalyzed analogs have often produced anomalous results. Use of such polyols in polyurethane foam has resulted in unexpectedly stiff and boardy foam where softer foam would be expected. See, e.g. R. L. Mascioli, "Urethane Applications for Novel High Molecular Weight Polyols," 32ND ANNULAR POLYURETHANE TECHNICAL/MARKETING CONF., Oct. 1–4, 1989, pp. 139–142. Moreover, in high resilience foam formulations, use of double metal cyanide complex catalyzed polyoxypropylene homopolymer polyols often leads to foam collapse. Therefore, the use of low unsaturation polyols with their closer-to-theoretical, actual functionality, and higher molecular weight, has not proven to be the panacea expected.

It has now been discovered that some of the anomalies experienced with polyether polyols of exceptionally low unsaturation are due to the presence of a very small amount of very high molecular weight polyether. It is not known for certain how this high molecular weight fraction comes to be produced. Without wishing to be bound to any particular theory, it may be possible that some isolated catalytic sites exhibit little substrate transfer, necessary to produce a product of uniform molecular weight. While the bulk of sites exhibit the desired transfer, those which do not result in continuous oxypropylation of a small number of molecules, creating the very small amount of high molecular weight product.

This high molecular weight portion of the polyether may, in some cases, act as a surfactant, altering the foam chemistry, or as a very high molecular weight reactant, altering the uniformity and therefore the orderedness of the polyurethane structure. Efforts are currently underway to eliminate the high molecular weight portion of the polyether.

The chemistry of water-blown microcellular foams differs substantially from that of neat elastomers and CFC-blown microcellular elastomers due to the creation of urea linkages during curing. In both neat and CFC or hydrocarbon blown, diol chain-extended microcellular elastomers, the hard segments are limited to those produced by the reaction of the isocyanate groups and the short chain diols, e.g. ethylene glycol, 1,4-butanediol, and 1,6-hexanediol. The linkages between the chain extender short segments and the prepolymer are urethane linkages. In water-blown microcellular elastomers, the reaction of water with the isocyanate results in the formation of an amino group and liberation of carbon dioxide as a chemical blowing agent. The amine thus produced reacts with the isocyanate groups to produce short, rigid urea linkages. Thus, in water-blown microcellular elastomers, the chemical blowing reaction generates both urea short segments as well as diol-derived urethane short segments. The two differing short segments alter phase out during cure as well as affecting elastomer properties due to the presence of the relatively polar but rigid urea groups. Moreover, the creation of reactive, amino-functional products derived from the isocyanate-terminated prepolymer allow these long blocks to inter-react by reaction of an isocyanate-terminated prepolymer molecule with an amino-terminated, previously isocyanate-terminated prepolymer molecule, which cannot be the case with neat elastomers. This inter-reaction creates polymers having abutting soft segments rather than continued alternation of hard and soft segments. Thus, the formulations and chemistries of neat elastomers cannot be extrapolated to water-blown microcellular elastomers.

The use of polyoxypropylene diols having from 5 to 15 weight percent internal oxyethylene moieties and having a low unsaturation has been shown quite surprisingly to result in water-blown polyurethane microcellular elastomers which exhibit higher tensile strength, higher elongation, and lower tear strength than otherwise similar microcellular elastomers prepared from similar, low unsaturation polyoxypropylene diols not having the required internal oxyethylene content. Moreover, other properties such as resilience, hardness, and compression set may be improved as well.

The improvements discovered are particularly surprising in view of the fact that the microcellular elastomers of the subject invention are prepared by a prepolymer process. In the preparation of conventional free rise or molded polyurethane foam, for example, particularly the latter, high primary hydroxyl content polyols are often used to increase reactivity, as primary hydroxyl groups react more rapidly with isocyanate groups than do secondary hydroxyl groups.

However, in the case of prepolymers, the hydroxyl groups of the polyol are reacted with isocyanate to form the isocyanate-terminated prepolymer long before the prepolymer is mixed with the chain extender and ingredients to form the microcellular elastomer. Therefore, whether the polyol hydroxyl groups are primary or secondary hydroxyl groups should make no difference, and thus prepolymers are not required to be prepared from high primary hydroxyl polyols. Furthermore, as the presence of the significant polyoxyethylene caps necessary to prepare high primary hydroxyl polyols are known to make polyurethane elastomers more subject to water adsorption, there has been no motivation to utilize ethylene oxide during propylene oxide polymerization when preparing the prepolymer diol component.

Thus, it was quite surprising that use of prepolymer diols prepared from propylene oxide copolymerized with ethylene oxide in a random manner not only increased physical properties but moreover decreased demold time. The decrease in demold time is particularly unexpected.

Chain extenders useful in the subject invention are the diol chain extenders having molecular weights less than 400 Da, preferably less than 300 Da. Such chain extenders include ethylene glycol, propylene glycol, 1,3-propanediol, 1,4-butanediol, 1,2- and 2,3-butylene glycol, 1,6-hexanediol, neopentylglycol, hydroquinone bis(2-hydroxyethylether), cyclohexanedimethanol, 1,4-cyclohexanediol, and the like. This list is illustrative and not limiting. Mixtures of diols may also be used. Much preferred is 1,4-butanediol. The chain extender supplies the most substantial part of total reactive groups in the B-side of the microcellular elastomer formulation.

Water is employed as a reactive blowing agent. The use of water as a blowing agent makes the chemistry and processing of the subject invention systems completely different and non-comparable to conventionally blown systems wherein physical blowing agents such as CFCs, PFCs, HCFCs, low boiling hydrocarbons, methylene chloride, and the like are used. Water is employed in an amount effective to produce the desired density, generally in the range of 0.15 $g/cm^3$ to 0.60 $g/cm^3$, preferably 0.2 $g/cm^3$ to about 0.5 $g/cm^3$. The amount of water may, for example, be from 0.1 part to 2.0 parts per 100 parts of the system B-side. The effective amount of water required is easily calculated or measured by one of ordinary skill in the art of microcellular elastomers. In practice, water may be added as a separate stream, but is virtually always mixed together with the chain extender and/or other isocyanate-reactive components and supplied as a B-side component.

The isocyanate-terminated prepolymer, chain extender, and water previously described are the required system components. Further, optional components include catalysts, additional polyether or other polyol, particularly polyol polymer dispersions, antioxidants, UV light stabilizers, fillers, plasticizers, and other additives and auxiliaries known to the art.

Catalysts are generally required. Suitable catalysts include the various metal catalysts, particularly those of tin such as stannous octoate, dibutyltin diacetate and dibutyltin dilaurate; and amine catalysts such as triethylene diamine and the like. The catalysts are generally used in amounts of from 0.01 part to 5 parts by weight, each relative to 100 parts total system, more preferably about 0.05 part to about 2 parts. The amounts are readily ascertained by those skilled in the art.

Polyol polymer dispersions are often useful, and preferred. While numerous dispersions of polymer in a "base" or "carrier" polyol may be used, the two most common polyol polymer dispersions used today are polymer-modified polyols formed by the in situ polymerization of vinyl monomers, and polymer polyols prepared by the in situ reaction of di- or polyisocyanates with reactive substances, i.e. the so-called PIPA and PHD polyols. All these polyol polymer dispersions have been commercially available. Solids contents range from about 5 weight percent to over 50 weight percent in the case of the polymer-modified polyols, and from about 5 to about 30 percent or more in the case of PIPA and PHD polyols.

The amount of polyol polymer dispersion or other polyol, i.e. polyols having molecular weights greater than about 400 Da, is generally limited such that less than 50 mol percent of the total B-side hydroxyl groups, preferably less than about 30 mol percent, and most preferably less than 20 mol percent is contributed by the polyol polymer dispersion base polyol or other higher molecular weight polyol. Unlike the polyol used to prepared the isocyanate-terminated prepolymer where the presence of primary hydroxyl groups is not important, here, the base polyol of the polyol polymer dispersion is preferably of higher primary hydroxyl content in order to increase reactivity. Primary hydroxyl contents of from about 30 mol percent to about 90 mol percent are preferred. The solids content and amount of the polyol polymer dispersion is such as to preferably provide from about 5 weight percent to about 30 weight percent solids, more preferably 8 to about 20 weight percent solids based on the weight of the B-side component.

Having generally described this invention, a further understanding can be obtained by reference to certain specific examples which are provided herein for purposes of illustration only and are not intended to be limiting unless otherwise specified.

EXAMPLES 1 AND 2; COMPARATIVE EXAMPLE C1

Two prepolymers were prepared in the conventional manner by reacting a stoichiometric excess of pure 4,4'-MDI with a polyoxypropylene "prepolymer diol." Both prepolymers contained 15% NCO groups. In Examples 1 and 2, the polyoxypropylene "prepolymer diol" was a 3000 Da molecular weight polyoxypropylene diol containing 10 weight percent random oxyethylene moieties and having an unsaturation of 0.005 meq/g. The prepolymer diol of Comparative Example C1 was a similarly prepared diol containing only oxypropylene moieties and no random oxyethylene moieties. The molecular weight of the all-propylene oxide derived polyol was c.a. 4000 Da and the unsaturation 0.007 meq/g.

Athletic microcellular midsoles were prepared from the above-identified prepolymers, the formulations and physical properties are set forth below in Table 1.

TABLE 1

| EXAMPLE | 1 | 2 | C1 |
|---|---|---|---|
| B-Side | | | |
| ARCOL ® E656[3] | 59.70 | 59.70 | 59.70 |
| ARCOL ® E660[4] | 40.30 | 40.30 | 40.30 |
| 1,4-butanediol | 15.50 | 15.50 | 15.50 |
| Water | 1.05 | 1.05 | 1.05 |
| Dabco ® 33LV | 0.25 | 0.25 | 0.25 |
| Dabco ® BI 11 | 0.42 | 0.42 | 0.42 |
| Dabco ® 120 | 0.014 | 0.014 | 0.014 |
| Y10788 Silicone | 1.0 | 1.0 | 1.0 |
| A-Side Prepolymer | MDI-derived, 15% NCO | MDI-derived, 15% NCO | MDI-derived, 15% NCO |
| Polyol in A-Side | Polyol A[1] | Polyol A[1] | Polyol B[2] |
| Index | 100 | 105 | 105 |
| Physical Properties: | | | |
| Density, $g/cm^3$ | 0.27 | 0.27 | 0.27 |
| Hardness, Asker C | 39 | 44 | 49 |

TABLE 1-continued

| EXAMPLE | 1 | 2 | C1 |
|---|---|---|---|
| Resiliency, % | 42 | 40 | 39 |
| Tensile, psi | 213 | 194 | 165 |
| Elongation, % | 644 | 520 | 407 |
| C Tear, lb/in | 40 | 33 | 31 |
| Split Tear, lb/in | 9.6 | 5.8 | 7.8 |
| Demold Time, min | 3 | 3 | 5 |

[1] Polyol A is a 3000 Da molecular weight polyoxypropylene diol containing 10 weight percent random oxyethylene moieties, and having an unsaturation of 0.005 meq/g.
[2] Polyol B is a 4000 Da polyoxypropylene diol containing no oxyethylene moieties, and having an unsaturation of 0.007 meq/g.
[3] ARCOL ® E 656 is a conventionally base-catalyzed polyoxyethylene capped polyoxypropylene triol having a hydroxyl number of 35.
[4] ARCOL ® E 660 is a styrene/acrylonitrile polymer polyol having a hydroxyl number of 20 and having a polyoxyethylene capped polyoxypropylene triol as the base polyol.

The results shown in Table 1 indicate that the subject invention midsoles possess significantly increased tensile strength, elongation, C tear, and split tear. The increase in these properties at lower index (100) is particularly noteworthy. The demold times of both of the midsoles of the subject invention are 40% less than the midsole prepared from an isocyanate-terminated prepolymer derived from a low unsaturation, all polyoxypropylene diol.

EXAMPLE 3 AND COMPARATIVE EXAMPLE C2

A series of midsoles were produced from prepolymers prepared as indicated above but having a higher weight % NCO content. The formulations and physical properties are set forth below in Table 2.

TABLE 2

| EXAMPLE | 3 | C-2 |
|---|---|---|
| B-Side Formulation | | |
| ARCOL ® 1375[1] | 70 | 70 |
| ARCOL ® E-815[2] | 30 | 30 |
| 1,4-butanediol | 2 | 2 |
| ethylene glycol | 7 | 7 |
| H$_2$O | 1.0 | 1.0 |
| Dabco ® 33LV | 1.0 | 1.0 |
| BL-17 | 0.18 | 0.18 |
| T-12 | 0.9 | 0.9 |
| L-5302 | 0.3 | 0.3 |
| A-Side Formulation | | |
| Polyol | Polyol A | Polyol B |
| % NCO | 18.5 | 18.5 |
| Physical Properties | | |
| Density, g/cm$^3$ | 0.27 | 0.26 |
| Hardness, Asker C | 45 | 47 |
| Resilience, % | 34 | 36 |
| Tensile, kg/cm$^2$ | 7.7 | 5.5 |
| Elongation, % | 184 | 189 |
| Split Tear, kg/cm | 1.7 | 2.1 |
| 90° Angle Tear, kg/cm | 6.9 | 4.1 |
| 50% compression set, % | 28.9 | 35.0 |

[1] ARCOL ® 1375 is a conventionally base-catalyzed polyoxyethylene-capped polyoxypropylene triol having a hydroxyl number of 23.
[2] ARCOL ® E-815 is a styrene/acrylonitrile polymer polyol having a hydroxyl number of 20 and having a polyoxyethylene capped polyoxypropylene triol as the base polyol.

The results presented in Table 2 again illustrate the significantly improved properties realized in midsoles using the prepolymers of the subject invention. Note that the tensile strength is increased by 40%, while the 90° angle tear is increased by almost 70%!

EXAMPLE 4 AND COMPARATIVE EXAMPLES C3 AND C4

A series of unitsoles were produced in a manner similar to the preceding examples. The formulations and physical properties are presented in Table 3 below.

TABLE 3

| EXAMPLE | 4 | C3 | C4 |
|---|---|---|---|
| B-Side Formulation | | | |
| ARCOL ® 1375 | 70 | 70 | 70 |
| ARCOL ® E-815 | 30 | 30 | 30 |
| 1,4-butanediol | 2 | 2 | 2 |
| ethylene glycol | 7 | 7 | 7 |
| H$_2$O | 1.0 | 0.35 | 1.0 |
| Dabco ® 33LV | 1.0 | 0.25 | 1.0 |
| BL-17 | 0.18 | 0.18 | 0.18 |
| T-12 | 0.02 | 0.02 | 0.02 |
| L-5302 | 0.3 | 0.3 | 0.3 |
| A-Side Formulation | | | |
| Polyol | Polyol A | Polyol C[1] | Polyol B |
| % NCO | 18.5 | 17.8 | 18.4 |
| Physical Properties | | | |
| Density, g/cm$^3$ | 0.43 | 0.43 | 0.44 |
| Shore A Hardness | 43 | 43 | 41 |
| Resilience, % | 44 | 42 | 41 |
| Tensile, kg/cm$^2$ | 23.2 | 18.7 | 8.9 |
| Elongation, % | 358 | 291 | 175 |
| Split Tear, kg/cm | 3.1 | 3.2 | 3.3 |
| 90° Angle Tear, kg/cm | 13.3 | 11.2 | 9.5 |
| 50% compression set, % | 19.1 | 18.8 | 31.3 |

[1] Polyol C is a conventionally base-catalyzed 2000 Da molecular weight polyoxypropylene diol containing no oxyethylene moieties, and having an unsaturation of 0.01 meq/g.

The results in Table 3 indicate that use of the prepolymers of the subject invention, when used in unitsoles of higher density (0.43 g/cm$^3$), produce soles with exceptional tensile strength and elongation, while having higher resiliency at the same time. Moreover, the 90° angle tear is significantly increased. The tensile strength of the random oxyethylene-containing, low unsaturation polyoxypropylene diol-based microcellular elastomer (Example 4) exhibited a tensile strength some 260% higher than that of the all-oxypropylene low unsaturation diol-derived microcellular elastomer (Example C4). In addition, the elongation increased by a factor of 2 while the 50% compression set both improved noticeably as well. The subject invention microcellular elastomer also showed significant improvement as compared with a microcellular elastomer prepared from a conventionally base-catalyzed, all-oxypropylene polyol (Example C3). It is noteworthy that the latter displayed superior physical properties in this system than a similar microcellular elastomer derived from the low unsaturation all-oxypropylene polyol, once again illustrating that substitution of low unsaturation polyols for conventional polyols does not necessarily result in improvement of physical properties.

EXAMPLE 5 AND COMPARATIVE EXAMPLE C5

To further illustrate the beneficial results of the subject invention, two systems similar to Example 1 were used to prepare low density microcellular shoe sole components. Polyol D used in Example 5 is a 4000 Da molecular weight polyoxypropylene prepolymer diol containing 10 weight percent random oxyethylene moieties and having an unsaturation of 0.005 meq/g. Polyol B used in Comparative Example C5 is the same polyol B as Example 1, a 4000 Da, all oxypropylene diol. The formulations and physical properties are given below in Table 4.

TABLE 4

| EXAMPLE | 5 | C5 |
|---|---|---|
| B-Side Formulation | | |
| ARCOL ® E656 | 60 | 60 |
| ARCOL ® E660 | 40 | 40 |
| 1,4-butanediol | 15.5 | 15.5 |
| Water | 0.95 | 0.95 |
| Dabco ® 33LV | 0.55 | 0.55 |
| Dabco ® B1 11 | 0.42 | 0.42 |
| Dabco ® 120 | 0.015 | 0.015 |
| Polycat ® SA-102 | 0.29 | 0.29 |
| Y10788 Silicone | 1.7 | 1.7 |
| A-Side Prepolymer | MDI-derived, 15% NCO | MDI-derived, 15% NCO |
| Polyol in A-side | Polyol D | Polyol B |
| Index | 105 | 105 |
| Physical Properties | | |
| Density, g/cm$^3$ | 0.27 | 0.27 |
| Hardness, Asker C | 51 | 52 |
| Resiliency, % | 39 | 38 |
| Tensile, psi | 175 | 148 |
| Elongation, % | 177 | 133 |
| C Tear, lb/in | 34 | 30 |
| Split Tear, lb/in | 5.5 | 4.2 |
| Demold Time, min | 6 | 8 |

The results presented in Table 4 again indicate that the subject prepolymer dials, containing random oxyethylene moieties, produce elastomers with superior physical properties as compared to otherwise similar, all-oxypropylene low unsaturation diols. Tensile strength, elongation, and split tear are noticeably improved, with slight apparent improvement in C-Tear. Note again that the demold time is significantly improved, surprising since the prepolymer NCO contents are the same, as are the B-side components. The decreased demold time can translate into up to a 33% increase in production employing the same number of molds.

Having now fully described the invention, it will be apparent to one of ordinary skill in the art that many changes and modifications can be made thereto without departing from the spirit or scope of the invention as set forth herein.

What is claimed is:

1. A microcellular polyurethane shoe sole component, comprising:
   the catalyzed reaction product of
   a) an isocyanate component comprising an isocyanate-terminated prepolymer having an NCO group content of from 12 to 20 weight percent comprising the reaction product of a stoichiometric excess of one or more di- or polyisocyanate with a polyoxypropylene diol, said diol having an unsaturation lower than about 0.02 meq/g, containing from 5 to 15 weight percent random oxyethylene moieties, and having a molecular weight between about 2000 Da and 8000 Da; with
   b) a resin component, comprising:
      b)i) an aliphatic or cycloaliphatic diol chain extender having a molecular weight of less than about 400 Da;
      b)ii) optionally, one or more polyol polymer dispersions; and
      b)iii) water in an amount effective to provide a microcellular density of from about 0.15 to about 0.60 g/cm$^3$ at an isocyanate index of from about 85 to 115.

2. The shoe sole component of claim 1 wherein said di- or polyisocyanate is selected from the group consisting of MDI, MDI variants, and mixtures thereof.

3. The shoe sole component of claim 1 wherein said polyoxypropylene diol has a molecular weight between about 2000 Da and 4000 Da.

4. The shoe sole component of claim 1 wherein the isocyanate index is from about 95 to about 105.

5. The shoe sole component of claim 1 wherein said component is a midsole having a density of from about 0.2 g/cm$^3$ to about 0.35 g/cm$^3$.

6. The shoe sole component of claim 1 wherein said component is a unitsole having a density of from about 0.30 g/cm$^3$ to about 0.60 g/cm$^3$.

7. A method of improving the physical properties of microcellular polyurethane shoe sole components prepared by the reaction of an isocyanate component with a resin component containing a diol chain extender, said method comprising:

selecting as a major portion of said isocyanate component, an isocyanate-terminated prepolymer having an NCO group content of from about 12 to about 20 weight percent, said prepolymer prepared by reacting a stoichiometric excess of one or more di- or polyisocyanates with a polyoxypropylene diol, said diol having an unsaturation less than about 0.02 meq/g, containing from about 5 to about 15% random oxyethylene moieties, and having a molecular weight of from about 2000 Da to 8000 Da; and reacting said isocyanate component with a diol chain extender component at an index of from about 75 to about 130 in the presence of an amount of water effective to produce a microcellular elastomer having a density of from about 0.15 g/cm$^3$ to about 0.60 g/cm$^3$.

8. The method of claim 7 wherein said di- or polyisocyanate is selected from the group consisting of MDI, MDI variants, and mixtures thereof.

9. The method of claim 7 wherein said polyoxypropylene diol has a molecular weight of from about 2000 Da to about 4000 Da.

10. The method of claim 7 wherein said reaction takes place at an isocyanate index of from about 95 to about 105.

11. The method of claim 7 wherein said shoe sole component has a density of from about 0.20 g/cm$^3$ to about 0.50 g/cm$^3$.

12. The method of claim 7 wherein said diol chain extender is an aliphatic or cycloaliphatic diol chain extender having a molecular weight less than 300 Da.

13. The method of claim 12 wherein said diol chain extender comprises 1,4-butanediol.

14. The method of claim 7, wherein said microcellular polyurethane shoe sole component exhibits a shorter demold time as compared to a microcellular polyurethane shoe sole component prepared from the same formulation with the exception that said polyoxypropylene diol contains less than 5 weight percent random oxyethylene moieties.

* * * * *